United States Patent
Zhang et al.

(10) Patent No.: US 11,579,956 B2
(45) Date of Patent: Feb. 14, 2023

(54) FEASIBILITY ANALYSIS FOR AUTOMATIC PROGRAMMATIC GENERATION OF A LOOKUP TABLE AND AUTOMATIC PROGRAMMATIC GENERATION OF THE LOOKUP TABLE THAT CONFORMS WITH AN ERROR TOLERANCE

(71) Applicant: The MathWorks, Inc., Natick, MA (US)

(72) Inventors: Yifu Zhang, Natick, MA (US); Aditya Dodda, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 17/210,613

(22) Filed: Mar. 24, 2021

(65) Prior Publication Data
US 2022/0179728 A1    Jun. 9, 2022

Related U.S. Application Data

(60) Provisional application No. 63/123,122, filed on Dec. 9, 2020.

(51) Int. Cl.
| | |
|---|---|
| G06F 9/44 | (2018.01) |
| G06F 11/07 | (2006.01) |
| G06F 16/2455 | (2019.01) |
| G06F 11/36 | (2006.01) |
| G06F 3/0484 | (2022.01) |

(52) U.S. Cl.
CPC ...... *G06F 11/0754* (2013.01); *G06F 11/0721* (2013.01); *G06F 11/3608* (2013.01); *G06F 11/3664* (2013.01); *G06F 16/2455* (2019.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 11,151,125 B1 * | 10/2021 | Dwivedi | ................... | G06F 9/54 |
| 11,263,229 B1 * | 3/2022 | Basavaiah | ............. | G06F 16/245 |

(Continued)

OTHER PUBLICATIONS

Mathworks, "Model-Based Calibration Toolbox", MathWorks [online], Retrieved from Internet URL: <https://www.mathworks.com/help/mbc/index.html>, Retrieved on Sep. 15, 2022, 19 pages.

*Primary Examiner* — Qamrun Nahar
(74) *Attorney, Agent, or Firm* — Goodwin Procter LLP

(57) ABSTRACT

Exemplary embodiments may perform feasibility analysis to determine whether it is possible to generate a lookup table that conforms to an error tolerance given a specification of a function or a set of data points that the lookup table attempts to approximate, an indication of breakpoint positions, and a specification of a data type for table values. Where it is determined that it is feasible to generate the lookup table, the lookup table may be automatically programmatically generated. Suggestions of how to modify the breakpoint positions and/or error tolerance may be provided. In addition, a visualization of approximation error and error tolerance, such as a visualization showing a feasibility margin, may be output. New data points may be processed to update table values for an already generated lookup table.

26 Claims, 12 Drawing Sheets

(56) References Cited

U.S. PATENT DOCUMENTS

| | | | |
|---|---|---|---|
| 11,269,876 B1* | 3/2022 | Basavaiah | G06F 8/77 |
| 2003/0018953 A1* | 1/2003 | Aberg | G06F 8/34 |
| | | | 717/105 |

* cited by examiner

LOOKUP TABLE 100

| BREAKPOINTS 102 | TABLE VALUES 104 |
|---|---|
| $bp_1$ | $tv_1$ |
| $bp_2$ | $tv_2$ |
| $bp_3$ | $tv_3$ |
| $bp_4$ | $tv_4$ |
| $bp_5$ | $tv_5$ |

FIG. 1
PRIOR ART

FEASIBILITY ANALYSIS FOR AUTOMATIC PROGRAMMATIC GENERATION OF A LOOKUP TABLE AND AUTOMATIC PROGRAMMATIC GENERATION OF THE LOOKUP TABLE THAT CONFORMS WITH AN ERROR TOLERANCE

CROSS-REFERENCE TO RELATED APPLICATIONS

This application claims the benefit and priority to U.S. Provisional Application No. 63/123,122, filed on Dec. 9, 2020, the entire contents of which are hereby incorporated by reference.

SUMMARY

In accordance with an inventive aspect, a processor-implemented method for programmatically indicating feasibility of programmatic generation of a lookup table includes receiving as input an indication of a function that the lookup table is to approximate or a set of data points which the lookup table is to approximate and also receiving as input breakpoint positions. The method further includes processing the received inputs with the processor to determine if it is feasible to programmatically generate the lookup table so that an error tolerance is satisfied given the breakpoint positions. Where it is determined that it is not feasible to programmatically generate the lookup table, an output indication that it is not feasible to programmatically generate the lookup table is generated with the processor, and where it is determined that it is feasible to programmatically generate the lookup table, the lookup table is programmatically generated with the processor.

The method may include receiving as input one or more of an indication of the error tolerance, a data type of table values or test points. Where it is determined that it is feasible to programmatically generate the lookup table, the method may further include generating an output indication that it is feasible to programmatically generate the lookup table. Where the lookup table is programmatically generated, the method may include outputting a visualization of table values of the lookup table. Where it is determined that it is feasible to programmatically generate the lookup table, the output indication may be a feasibility margin and/or an indication that it is feasible to programmatically generate the lookup table. Instructions for performing the method by a processor may be stored on a non-transitory computer-readable storage medium.

In accordance with another inventive aspect, a processor-implemented method includes receiving as input an indication of a function that the lookup table is to approximate or a set of data points which the lookup table is to approximate, and breakpoint positions. The method also includes processing the received input with the processor to determine if it is feasible to programmatically generate the lookup table so that an error tolerance is satisfied. It is determined with the processor that it is not feasible to programmatically generate the lookup table so that the error tolerance is satisfied and an output indication that it is not feasible to programmatically generate the lookup table so that the error tolerance is satisfied is generated with the processor. At least one suggestion for modifying one of the breakpoint positions or the error tolerance is output on an output device.

The at least one suggestion may include a suggestion for modifying the error tolerance or a suggestion for modifying the breakpoint positions. Instructions for performing the method by a processor may be stored on a non-transitory computer-readable storage medium.

In accordance with an additional inventive aspect, a processor-implemented method includes performing with the processor a feasibility margin analysis that identifies approximation error values between function values or data points and lookup table values for a lookup table. A user interface is generated on an output device that depicts the approximation error values relative to an error tolerance. The user interface includes at least one activatable user interface element. In response to activation of one of the at least one activatable user interface element, a corresponding modification is made for the lookup table. The lookup table is programmatically generated with the processor based on the modification.

The activatable user interface element that is activated may be a graphical element that may be altered to modify the error tolerance or a graphical element that may be altered to modify the breakpoint positions. Instructions for performing the method by a processor may be stored on a non-transitory computer-readable storage medium.

In with another inventive aspect, a method performed by a processor of a computing device includes receiving as inputs: a specification of a sequence of breakpoints ranging from a first breakpoint to a last breakpoint, and a specification of data values for a lookup table. The first breakpoint in the sequence is set as a current breakpoint. For each test point in a sequence of test points ranging from a first test point to a last test point in an interval between the current breakpoint and a next breakpoint in the sequence, a difference is determined between each data value and an error function value. A maximum of the differences for the interval is determined. For each test point in the sequence of test points ranging from the first test point to the last test point in the interval between the current breakpoint and a next breakpoint in the sequence, a sum of the each data value and the error value for the data value is determined. A minimum of the sums for the interval is determined. A table value for the current breakpoint is determined to be a value between the maximum of the differences and a minimum of the sums. The lookup table having the determined table value for the current breakpoint is programmatically generated.

The lookup table may employ zero-order interpolation. The zero-order interpolation may be one of flat interpolation or nearest interpolation. Instructions for performing the method by a processor may be stored on a non-transitory computer-readable storage medium.

In accordance with yet another inventive aspect, a method performed by a processor of a computing device includes receiving additional data points for a lookup table to approximate where the lookup table has a table value for each breakpoint of the lookup table. The additional data points are processed with the processor to determine which breakpoints warrant modification of the table values and to determine updated table values for the determined breakpoints. The lookup table is updated with the processor to include the determined updated table values. Instructions for performing the method by a processor may be stored on a non-transitory computer-readable storage medium.

In accordance with a further inventive aspect, a computing device includes a memory and/or storage for storing a feasibility analyzer and lookup table generator. The computing device also includes a processor for executing the feasibility analyzer and lookup table generator to: receive as input an indication of a function that the lookup table is to approximate or a set of data points which the lookup table is to approximate; receive as input breakpoint positions; process the received inputs with the processor to determine if it is feasible to programmatically generate the lookup table so that an error tolerance is satisfied given the breakpoint positions; where it is determined that it is not feasible to programmatically generate the lookup table, generate an output indication that it is not feasible to programmatically generate the lookup table; and where it is determined that it is feasible to programmatically generate the lookup table, programmatically generating the lookup table with the processor.

BRIEF DESCRIPTION OF THE DRAWINGS

FIG. 1 depicts a conventional lookup table.

DETAILED DESCRIPTION

A lookup table is an array that replaces a runtime computation with a lookup operation. The lookup table maps input values to output values. FIG. 1 depicts an illustrative lookup table 100. The lookup table has breakpoints 102 ($bp_1, \ldots, bp_5$) and table values 104 ($tv_1, \ldots, tv_5$). Each breakpoint 102 represents an input value to which a corresponding output value (i.e., a table value 104) is mapped. Thus, breakpoint $bp_1$ is an input value that maps to output value $tv_1$. This lookup table 100 is a simplified table. The lookup table may be multidimensional. The breakpoints 102 and the table values 104 may be vectors in some instances.

Figure 2:
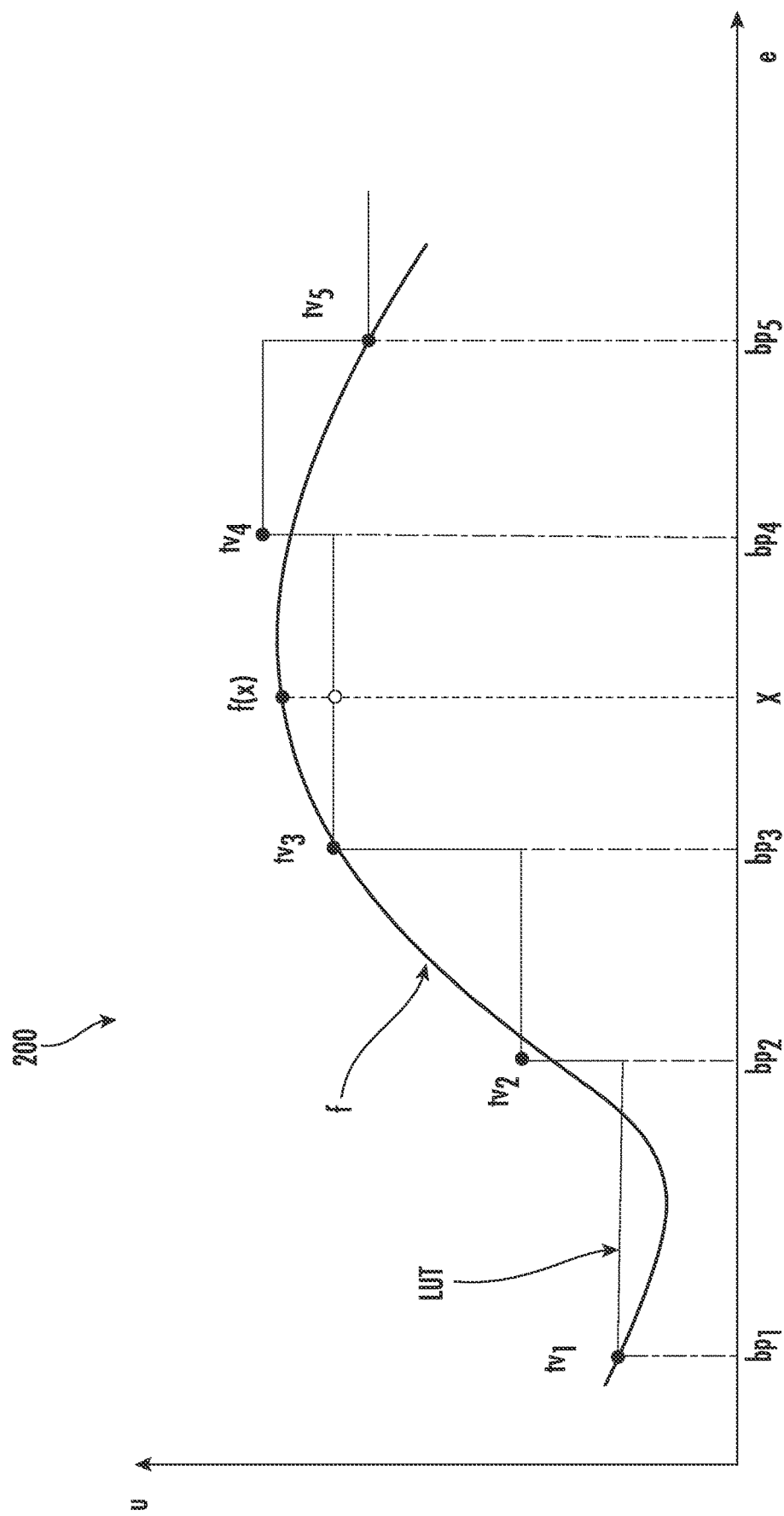
FIG. 2 depicts a conventional plot of a function and a plot of lookup table values that approximate the function.

One use of a lookup table is to replace computation of a function with a table lookup operation. FIG. 2 depicts a plot 200 of $u=f(x)$, where u is a dependent variable as a function $f( )$ of an independent variable x. The curve of the value of $f(x)$ is shown for various values of x. The breakpoints $bp_1, \ldots, bp_5$ for the lookup table that represents the function $f(x)$ are shown. As can be seen, each breakpoint represents an input value x for the function $f(x)$. The table values in this instance approximate the value of u (i.e., $f(x)$) for the input value of the breakpoint.

The lookup table 100 does not have a breakpoint for each possible input value. Having all of the input values would result in a very large table and is not practical or even possible in some instances, such as for a continuous function. Hence, when a lookup table is in use, the input value usually does not exactly match one of the breakpoint values. FIG. 2 shows a plot of $f(x)$ and lookup table (LUT) values. The input value x is an example of an input that lies between breakpoints $bp_5$ and $bp_4$. In order to account for input values that do not fall on a breakpoint, interpolation may be used. FIG. 2 shows an example where flat interpolation may be used. In this example, for all the input values falling in the interval extending from $bp_1$ up to but not including $bp_2$, the output value is $tv_1$. Graphically, this flat interpolation is reflected as the flat line for the lookup table values from $bp_1$ up to but not including $bp_2$ in FIG. 2.

Figure 3A:
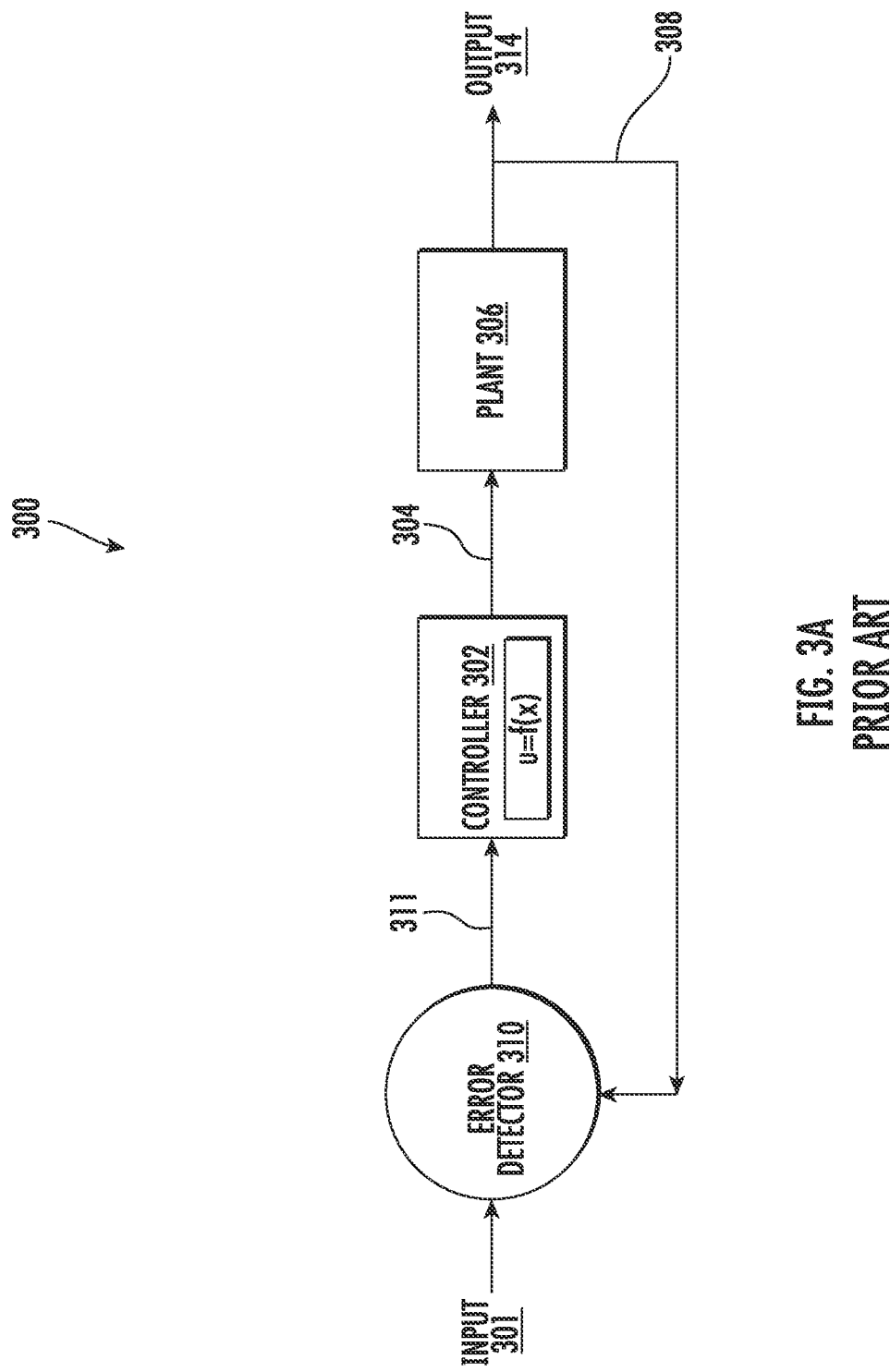
FIG. 3A depicts a conventional control system that uses a control function.

Lookup tables have a wide range of uses. For example, lookup tables may be used to approximate nonlinear activation functions in neural networks, approximate trigonometric functions, approximate computationally expensive functions, etc. Lookup tables are used in a wide variety of engineering and mathematical applications. One use is in control systems where a control function $f(x)$ is needed to determine how to control a plant. FIG. 3A shows an example of such a conventional control system 300. A controller 302 controls a plant 306 by providing a control signal 304 to the plant. The generation of the control signal value entails calculating the control function $u=f(x)$. The controller 302 calculates the value u of the control signal 304 based on the value x of an error signal 311 that is calculated by an error detector 310. The error detector 310 receives an input 301 and determines the error based on the previous value of the output 314 and the current input 301. The output 314 is fed back via a feedback loop 308 to the error detector 310. The error signal 311 may represent the difference between the previous output and the current input. The controller 302 attempts to reduce the error and generates a control signal 304 to adjust the plant 306 accordingly.

Figure 3B:
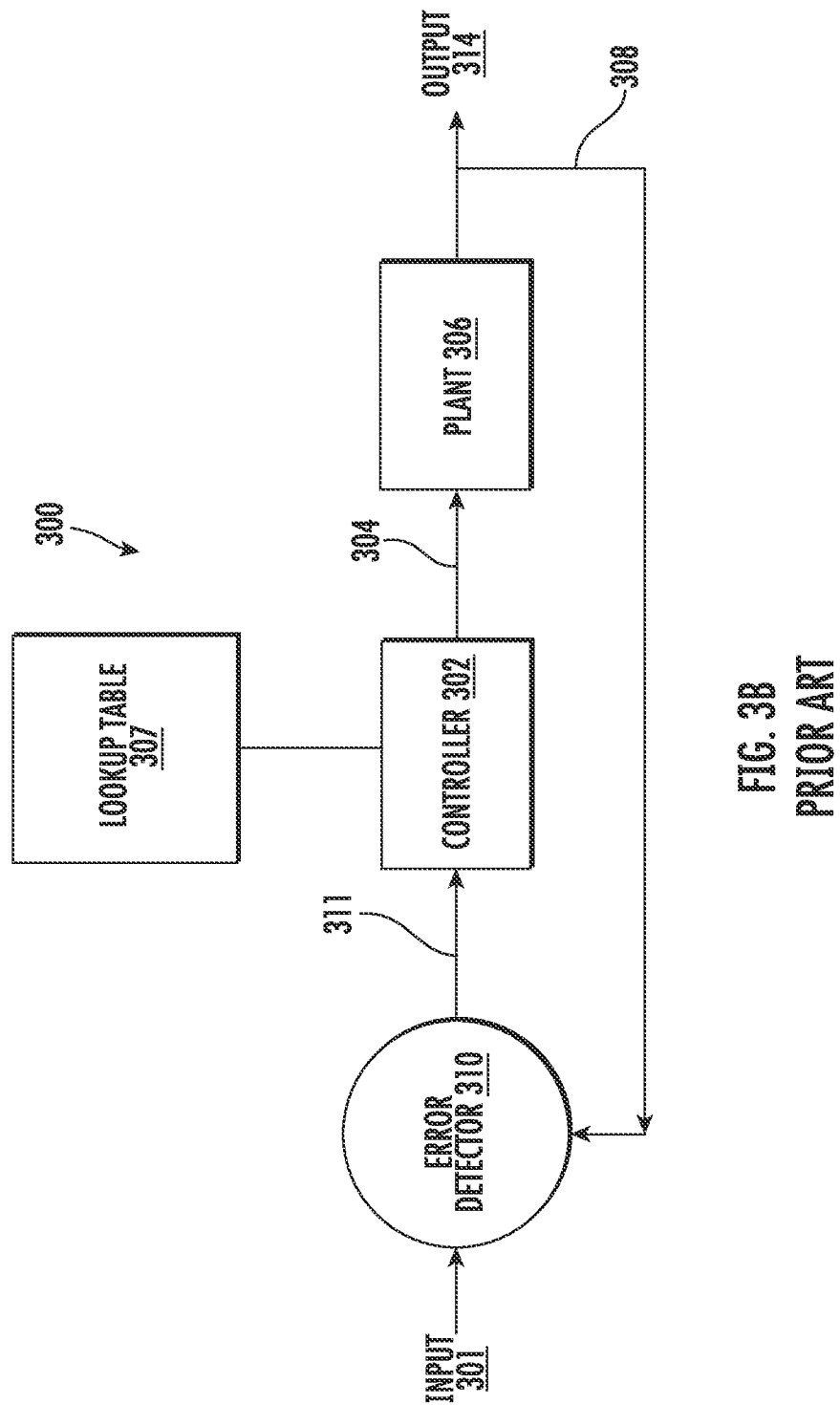
FIG. 3B depicts a conventional control system that uses a lookup table to approximate a control function.

It may be computationally expensive and slow to calculate the value of u by determining $f(x)$ for each time that the control signal needs to be updated. Hence, a lookup table 307 may be used to provide a tabular representation of $f(x)$. FIG. 3B shows a control system 300' where the computation of the control function is replaced with a lookup table 307. The components of control system 300' are otherwise the same as control system 300. The operation of accessing the lookup table value may be much faster and less computationally intensive than determining the control function value, but the operation may introduce some approximation error while representing the function.

Because using a lookup table to replace a function or data set in general leads to approximation error, there is a need to adjust lookup table parameters (e.g., table values, number and/or position of breakpoints, and/or data type of the table values) such that the approximation error remains within a satisfactory range defined by some error criterion. In the exemplary embodiments, the error criterion is captured in something denoted herein as "error tolerance".

Generating a lookup table and tuning table values of a lookup table may be difficult tasks. Tuning may entail modifying parameters relating to the lookup table to get an improved or even optimal lookup table based on certain objectives, such as producing a lookup table that conforms with some error tolerance. Challenges with these tasks include choosing table values during generation of a lookup table and tuning or updating the table values in response to additional observed data. It may be difficult to select table values given breakpoint values and data types of the table values in a such a way that the resulting lookup table conforms with a desired error tolerance. Oftentimes, it is difficult to know if it is even feasible to generate a lookup table that satisfies the desired error tolerance with specified breakpoint values and a specified data type. Moreover, it is difficult to choose table values that are optimal or that are at least close to optimal.

Exemplary embodiments may address these problems that are encountered during generation of a lookup table or tuning of table values for a lookup table. The exemplary embodiments may provide an automatic programmatic solution to generating a lookup table with optimal, near optimal table values or merely table values that do not produce approximation errors that exceed the error tolerance indication. The exemplary embodiments may provide automatic programmatic generation of a lookup table. "Automatic programmatic generation" means that the lookup table is generated by one or more processors executing computer programming instructions. The exemplary embodiments may adopt an approach to generating the table that facilitates parallel computation and requires only low computational cost operations and use of computational resources to determine optimal table values. In some exemplary embodiments, the lookup table values for the generated lookup table may be optimal or near optimal table values.

Exemplary embodiments may also provide an indication of whether it is feasible to generate a lookup table that satisfies a specified error tolerance indication. The specified error tolerance indication may be a function whose value evaluated at an input value is a tolerance metric for the approximation gap between the function value and the lookup table value at the input value. Specifically, the gap at the input value is the absolute value of $(\alpha-\beta)$, where $\alpha$ is the function value evaluated at the input value, and $\beta$ is the lookup table's output evaluated at the input value. The exemplary embodiments may output an indication of whether or not the generation of the lookup table is feasible and/or may output an indication of a feasibility margin that indicates specifies a margin of error between the table values and the underlying function or data points that the table represents.

A user interface may enable a user to adjust the error tolerance and/or change characteristics of the lookup table in order to increase or decrease the feasibility margin. For example, if there is an indication of infeasibility, a user may wish to take steps that result in an increase in the feasibility margin so that generation of the lookup table becomes feasible. If there is an indication of feasibility, the user still may wish to make adjustments, such as using fewer breakpoints, which may decrease the size of the lookup table.

Exemplary embodiments may make suggestions to modify parameters like breakpoint positions or the error tolerance to make feasible the generation of a lookup table that conforms with the error tolerance or to reduce breakpoints to make the lookup table smaller while maintaining feasibility of generating the lookup table. For example, if it is not feasible to generate the lookup table given the inputs so that the error is always within the error tolerance, a suggestion may be generated to increase the number of breakpoints or to relax the error tolerance so that more error is permitted. Suggestions may also be generated where it is determined that generating a lookup table is feasible. For example, a suggestion may recommend fewer breakpoints or a tightening in error tolerance.

The inputs may specify a function $f(x)$ or may specify data points. In some instances, a user may not know the exact input-output relation for a set of data points, so the set of data points is itself specified instead, or it may be the case that the data points may not correspond to a mathematical 'function' due to there being two or more observed output values for the same input value x. The exemplary embodiments may perform a feasibility analysis and generate a lookup table for both the case where a function $f(x)$ is input or where data points are input. A data point may be a tuple (x, y), where x is the data point's horizontal value and y is the data point's vertical value. For narrative simplicity, this discussion refers to a data point's horizontal value as its x value and its vertical value as its y value. In addition, the exemplary embodiments are able to adapt the lookup table to account for new data points.

Figure 4:
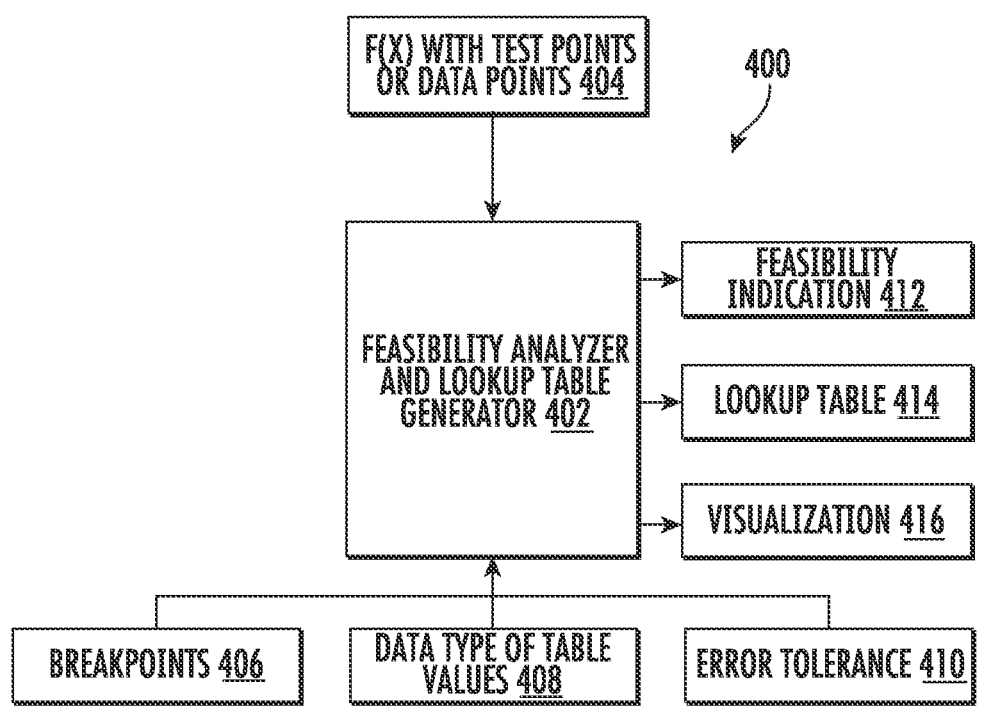
FIG. 4 depicts a block diagram of the inputs and outputs of the feasibility analyzer and the lookup table generator of an exemplary embodiment.

FIG. 4 depicts a diagram 400 showing the inputs and outputs for the feasibility analyzer and lookup table generator 402 that may be used in the exemplary embodiments in checking feasibility of generating a lookup table and where it is determined that such generation of a lookup table is feasible, generating the desired lookup table. The feasibility analyzer and lookup table generator 402 performs the feasibility analysis, lookup table generation, visualization of output, generation of suggestions, and accommodation of additional data values that are described below. A user may specify a number of inputs in order for the feasibility analyzer 402 and lookup table generator 402 to properly analyze feasibility of generating a lookup table and to programmatically generate the lookup table. The user may be a person or a programmatic entity that provides the inputs. The user has an option of specifying a function $f(x)$ with test points 404, such as by inputting a handle or other unique identifier of computer programming code for performing the function. The specified function is the one for which the lookup table holds approximate values to avoid computation of the function each time a function value is needed. Alternatively, the user may specify a set of data points 404. The lookup table attempts to approximate these data points. The user may provide as input some information for accessing the data points in memory or storage.

The feasibility analyzer and lookup table generator 402 may also receive breakpoint values 406 as input. These are the breakpoint values that the user wishes to have in the generated lookup table. The feasibility analyzer and lookup table generator 402 may receive an indication of a data type for table values 408. The data type may be, for example, floating point, integer, etc. The data type constrains values that the table values may take. The definition of a data type specifies an in-memory representation, so the choice of a data type results in a choice of the in-memory representation. This in-memory representation may limit the resolution of values by limiting the number of bits allocated for storing the values in memory. The feasibility analyzer and lookup table generator 402 additionally may receive an error tolerance 410. The error tolerance 410 specifies what amount of approximation error is acceptable to the user for a given input value. The error tolerance need not be constant across all input values; rather the error tolerance may vary across input values. The error tolerance 410 may be expressed as a function as mentioned above. The user thus may pass a handle to computer programming code for performing the error tolerance function. The errors to which the error tolerance 410 is applied are the approximation errors between the values returned by the lookup table across test points (i.e., a collection of inputs of interest to the user) and the actual values of the function $f(x)$ when the lookup table approximates $f(x)$, or alternatively, when the lookup table approximates a data set of data points, the approximation error for each data point is between they value of the data point and the lookup table's output evaluated at the x value of the data point. If the user provides a function $f(x)$, the user provides the test points as well. If the user provides a data set to approximate, the approach described herein determines the test points, where the test points are the collection of distinct x values of data points in the data set.

As was mentioned above, the feasibility analyzer and lookup table generator 402 may produce a feasibility indication 412 as output. The feasibility indicator 412 indicates whether it is feasible or not to generate the lookup table given the inputs. The feasibility indicator may be a binary value that assumes one of two values, such as "feasible" or "infeasible." The feasibility indicator may in some embodiments be output as a value, such as 1 or 0, or alternatively "True" or "False." In some exemplary embodiments, a textual or graphical output indicative of the generation of the lookup table as being feasible or infeasible may be output on a display device. For example, text may be displayed that says, "It is feasible to generate a lookup table," or "It is not feasible to generate a lookup table." Audio or video output may be generated as part of the feasibility indication 412. The feasibility indication instead of or in addition to the outputs specified above may include a feasibility margin. The feasibility margin specifies, for possible input values and table values chosen by the feasibility analyzer and lookup table generator 402, a margin between the calculated or estimated error and the error tolerance. If all of the error values are not bigger than the error tolerance, it is an indication that the generation of the lookup table is feasible. Conversely, if at least one of the error values exceeds the error tolerance, the generation of the lookup table is infeasible.

The feasibility analyzer and lookup table generator 402 may generate a lookup table 414 based on the inputs 404, 406, 408 and 410. The lookup table 414 in some instances may conform with the error tolerance with some inputs 404, 406, 408 and 410 and may not conform with the error tolerance in other instances 404, 406, 408 and 410. The feasibility analyzer and lookup table generator 402 may also output a visualization 416 to provide useful information to the user.

Figure 5:
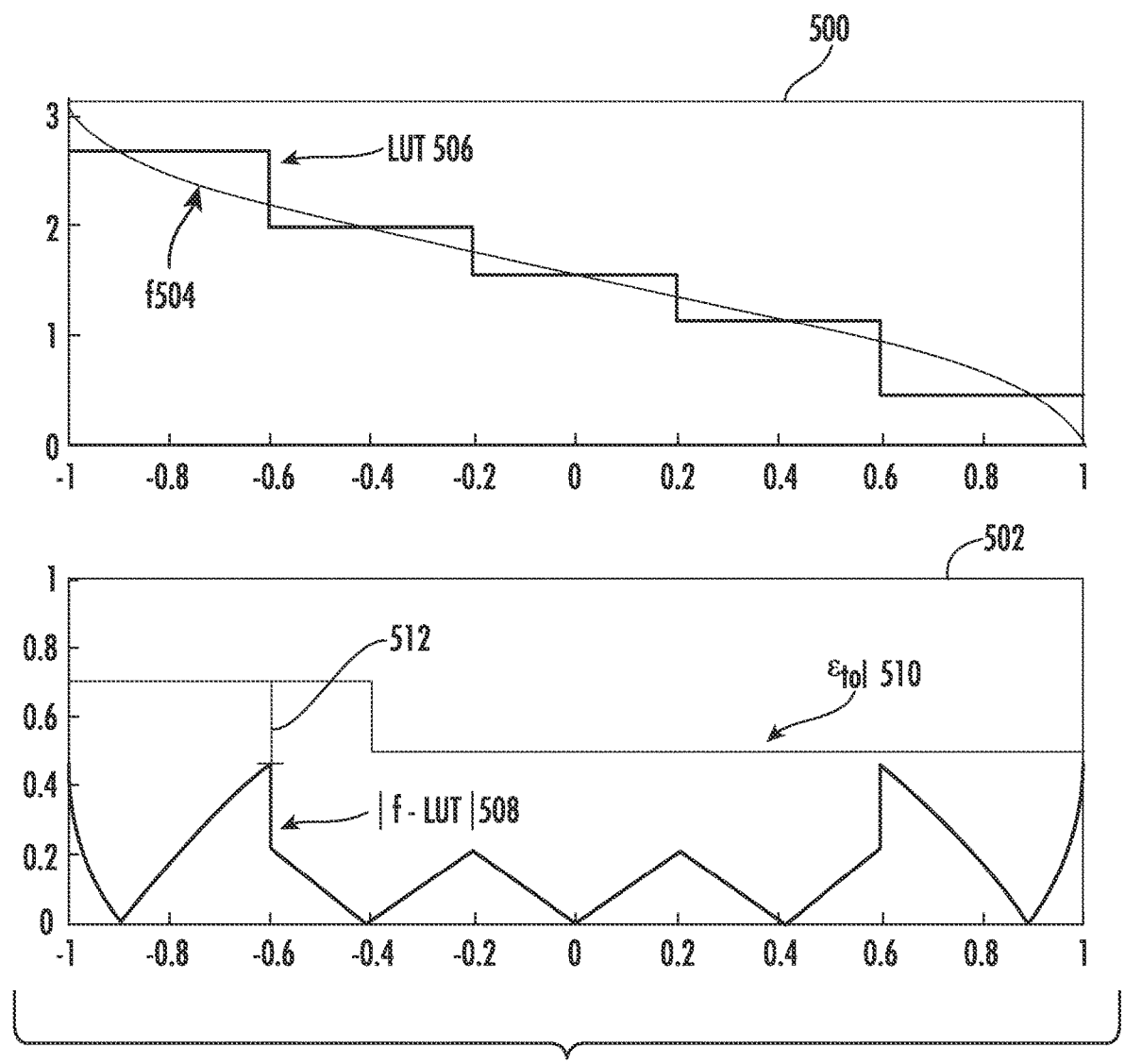
FIG. 5 depicts an example of a visualization that may be produced by an exemplary embodiment.

FIG. 5 depicts an example of the variety of information that may be output as part of the visualization 416. The visualization 416 may include plot 500 and/or plot 502. Plot 500 displays a curve 504 of output values for the function $f(x)$ across inputs. The vertical axis is for the values of the outputs, and the horizontal axis is the values of the inputs. The plot 500 shows a curve 506 of the lookup table value outputs across inputs. The horizontally extending flat portions of the curve 506 reflect the flat interpolation between breakpoints.

Plot 502 includes a curve 508 for the magnitude of error between the function $f(x)$ and the output of the lookup table (LUT) across input values (i.e., values of x). The vertical axis is for the magnitude of the error, and the horizontal axis is for the input values. The plot 502 also shows a curve 510 of the error tolerance across input values. As can be seen for input values like 0.6, the error approaches the error tolerance, whereas for an input value like −0.6 the error is substantially less than the error tolerance. The margin 512 between the error value at −0.6 and the error tolerance is quite large. The plot 502 may be useful to a user. The plot 502 shows which input values have the most error and which input values have the least error. The plot 502 also depicts the margin between the error and the error tolerance. If the error value for no input is larger than the corresponding error tolerance value, generation of a lookup table conforming with the error tolerance is feasible. If not, generation of a lookup table conforming with the error tolerance is not feasible given the inputs that specify parameters for the lookup table.

The plot 502 may help a user to identify how to modify the inputs to make the generation of a lookup table that conforms with the error tolerance feasible. The plot 502 may also indicate that there is room for additional error while still not exceeding the error tolerance. Thus, the user may trade off accuracy for something like fewer breakpoints. As is explained below, the exemplary embodiments may provide tools for making such adjustments to the inputs.

Figure 6:
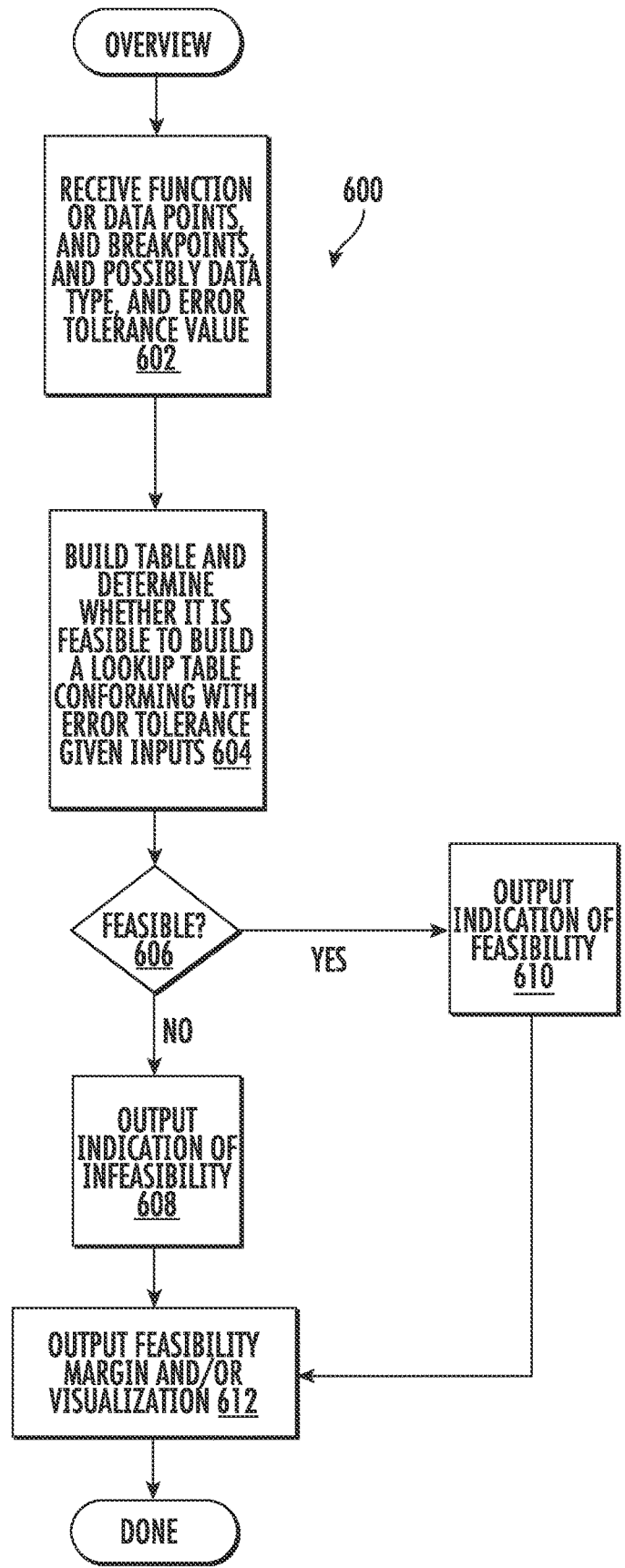
FIG. 6 depicts a flowchart of illustrative steps that may be performed to determine feasibility of programmatic generation of a lookup table and generation of outputs including a lookup table.

FIG. 6 depicts steps that may be performed by feasibility analyzer and lookup table generator 402 in exemplary embodiments relating to the feasibility analysis for lookup table generation. Initially, the function $f(x)$ or data points, the breakpoints, the data type of the table values, and/or the error tolerance function may be received as input (see 602). The feasibility analyzer and lookup table generator 402 builds a lookup table using the inputs provided and determines whether it is feasible to generate a lookup table conforming with the error tolerance given the inputs (see 604). If it is feasible (see 606), an indication of feasibility may be output (see 610), such as on a display device. If it is not feasible (see 606), an indication that it is not feasible may be output (see 608) instead. The feasibility margin and/or a visualization 416 may be output (see 612) as described above relative to FIG. 4.

Figure 7:
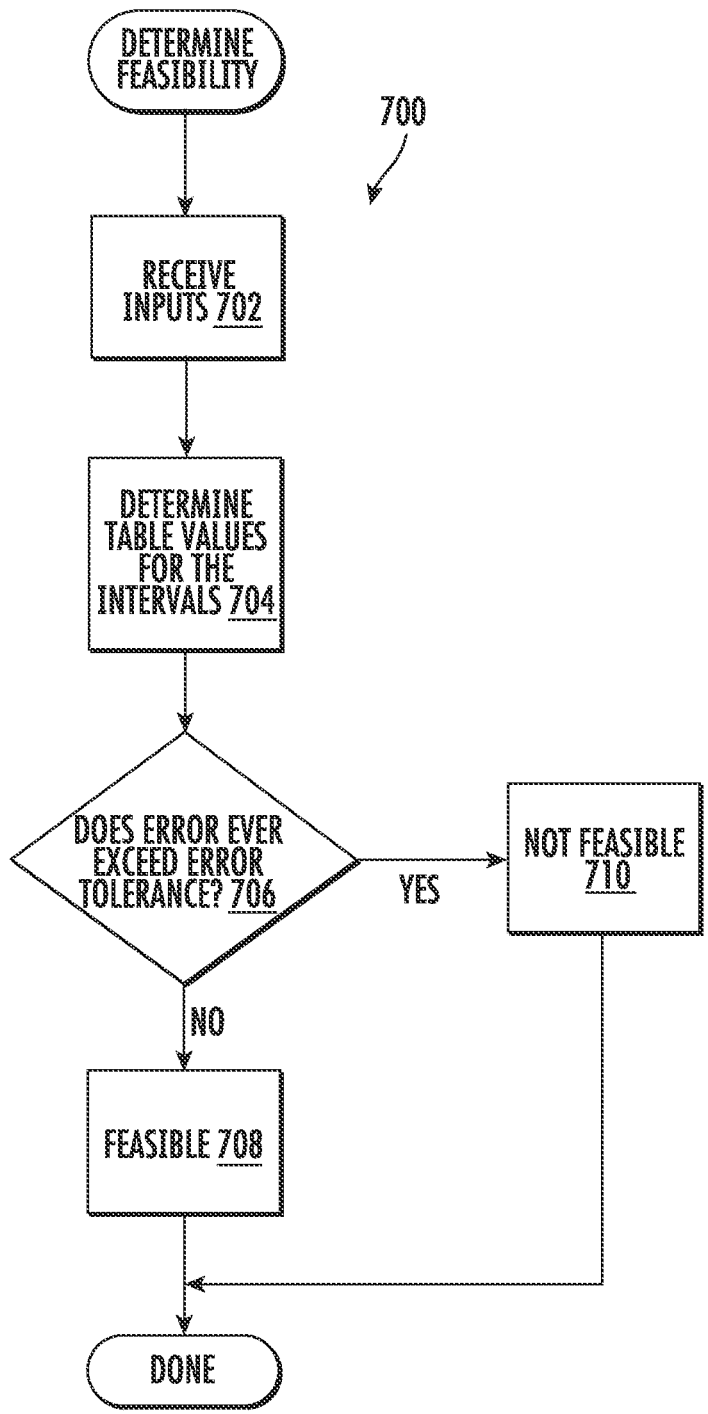
FIG. 7 depicts a flowchart of illustrative steps that may be performed in a feasibility analysis in an exemplary embodiment.

FIG. 7 shows a flowchart 700 of steps that may be performed to determine feasibility of generating a lookup table that keeps error below the error tolerance across the data values given the inputs to the feasibility analyzer and lookup table generator 402. The inputs are received by the feasibility analyzer and lookup table generator 402 as described above (see 702). Table values are determined for each breakpoint by examining error values for test points in the associated intervals (see 704). The breakpoints are organized in a sequence. The sequence can be monotonically increasing or monotonically decreasing. Between the second breakpoint in the sequence and the second to last breakpoint in the sequence, an interval extends from a breakpoint up to the next breakpoint. Thus, as shown in FIG. 2, there is an interval from $bp_2$ up to $bp_3$, and the next interval from $bp_3$ up to $bp_4$, and so forth. There is a first interval that may extend from $bp_1$ up to $bp_2$ in some exemplary embodiments or may extend from $-\infty$ to $bp_2$ in some other exemplary embodiments. There is a second to last interval $[bp_{n-1}, bp_n)$ and a last interval $[bp_n, +\infty)$ or from $bp_n$ to a number larger than $bp_n$ in some exemplary embodiments.

The table values for the breakpoints may be determined in parallel in some exemplary embodiments. There is no dependency between calculations for the table values of respective breakpoints. As such, table values for respective breakpoints may be determined by separate processing entities in parallel. Moreover, the operations that are used in determining the table values are simple operations (such as addition, division, determination of a minimum, determination of a maximum, and quantization) that are not computationally intensive. Hence, the operations may be performed quickly.

Figure 8:
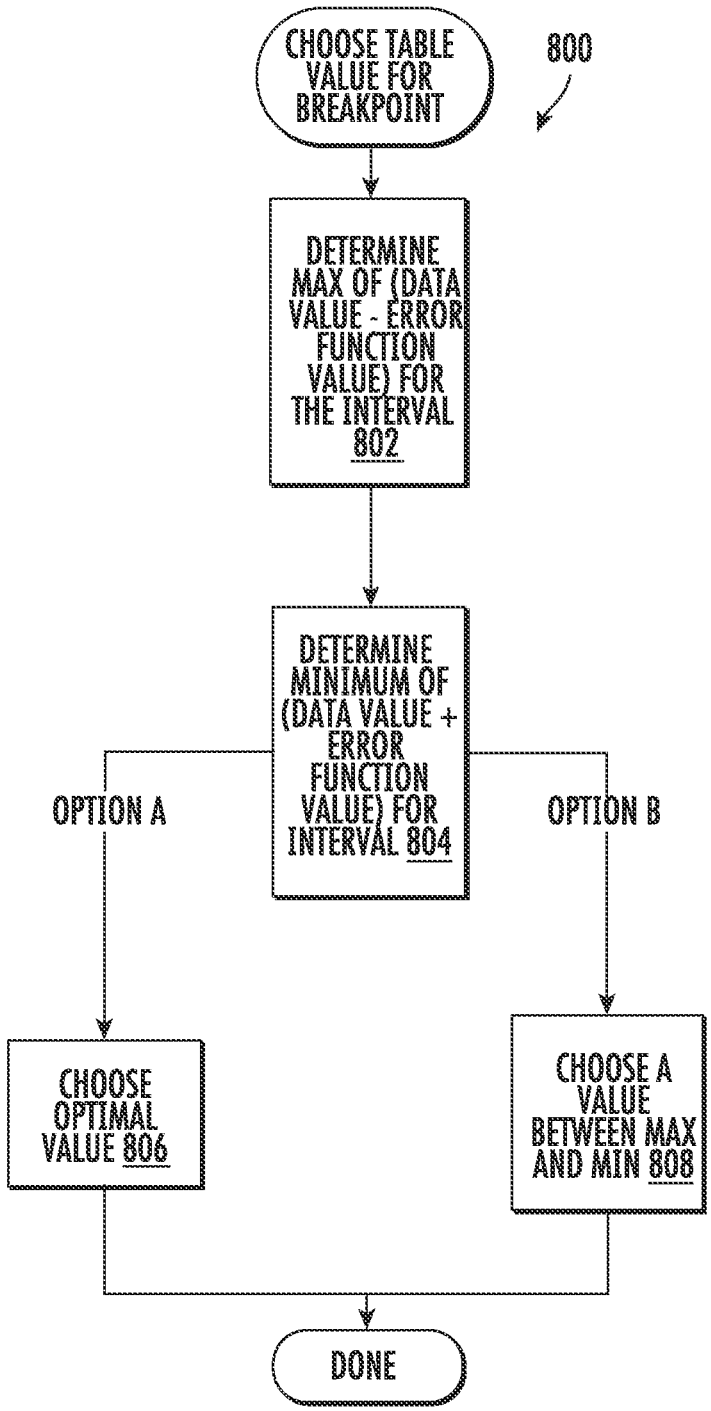
FIG. 8 depicts a flowchart of illustrative steps that may be performed to choose a table value at a breakpoint in an exemplary embodiment.

FIG. 8 shows a flowchart of illustrative steps for determining table values for a given breakpoint. It is helpful to define some terms in order to explain how the table values for the breakpoints are determined. For simplicity, a one-dimensional lookup table is considered here. Denote $\tau \triangleq (\tau_1, \tau_2, \ldots, \tau_n) \in R_n$ as the breakpoint vector, where $\tau_1 < \tau_2 < \ldots < \tau_n \in R$. Let $y \triangleq (y_1, y_2, \ldots, y_n) \in R_n$ be the corresponding table value vector. Define $tp \triangleq (tp_1, tp_2, \ldots, tp_m) \in Rm$ as the test point vector, where $tp_1 < tp_2 < \ldots < tp_m$. Given $\varepsilon_{abs}$, a positive number representing the approximation gap measured by an absolute magnitude and $\varepsilon_{rel}$, a positive number representing the approximation gap measured by a relative magnitude with respect to the magnitude of the $f(x)$ and a function $f: R \rightarrow R$, denote the error function, for example, as $$e^{integ}(x) \triangleq \max\{\varepsilon_{abs}, \varepsilon_{rel}|f(x)|\}, \forall x \in R.$$

It should be appreciated that the error function may be an arbitrary function and that the specified error function $e^{integ}(x)$ is intended to merely illustrative.

The approach described herein assumes that flat interpolation is used with the lookup table, but other zero-order interpolation methods may be used instead.

Given $\tau$ and $y$, denote its flat interpolation as $$LUT(x, y, \tau) = \begin{cases} y_1 & \text{if } x \leq \tau_1, \\ y_i & \text{if } \tau_i \leq x < \tau_{i+1}, \forall i \in [1, n-1]_N, \\ y_n & \text{if } x > \tau_n. \end{cases}$$

The method works for other zero-order interpolation methods where $LUT(x,y,\tau)$ is a piece-wise constant in y. For instance, $$LUT(x, y, \tau) = \begin{cases} y_1 & \text{if } x \leq \tau_1, \\ y_i & \text{if } x \in [\tau_i, \tau_{i+1}] \text{ and } x - \tau_i < \tau_{i+1} - x, \\ & \forall i \in [1, n-1]_N, \\ y_{i+1} & \text{if } x \in [\tau_i, \tau_{i+1}] \text{ and } x - \tau_i \geq \tau_{i+1} - x, \\ & \forall i \in [1, n-1]_N, \\ y_n & \text{if } x > \tau_n. \end{cases}$$

is another zero-order interpolation method known as "nearest interpolation" that may be used. Since r is given by the user, $LUT(x,y)$ is used as a simplified notation for $LUT(x,y,\tau)$.

The feasible region is defined as $$\overline{A} \triangleq \{y \in \mathbb{R}^n \ ||f(x) - LUT(x,y)| \leq e^{integ})\forall x \in t \quad p \quad \text{and} \quad Q(y) = y\},$$

where $Q(y)$ denotes the quantized value of y with respect to the specified table value data type, and the expression $Q(y)=y$ means that the quantized value of y equals y (i.e., that y is representable in the specified table value data type). Feasibility of generating the lookup table may be determined if there are table values for each of the test points that have an approximation error that does not exceed the error tolerance.

In the case of zero-order interpolation, the approximation error in each interval $[\tau_i, \tau_{i+1})$ is only impacted by the table value for that interval $y_i$ and the test points lying between the interval. As such, it is independent of the approximation error in any other interval $[\tau_j, \tau_{j+1})$ with $j \neq i$. Therefore, minimizing the overall approximation error with respect to y is equivalent to individually minimizing the approximation error for each interval $[\tau_i, \tau_{i+1})$, where the decision variable is simply $y_i$.

Accordingly, as shown in FIG. 8, for each interval, the maximum of (data values–error function values) is calculated for each interval (see 802). The data values are they value of data points or the $f(x)$ values at test points in the interval. The error function values represent the values of the error function evaluated at x values of data points in the interval or at the test points in the interval. The specified maximum is determined over all the test points in the interval. The minimum of (data values+error function values) is determined (see 804) as well. These maxima and minima for the intervals when the function $f(x)$ is an input may be expressed as:

$$\overline{h}_i \triangleq \max_{\substack{x \in tp \\ x \in [\tau_i, \tau_{i+1})}} \{f(x) - e^{inreg}(x)\}, \underline{h}_i \triangleq \min_{\substack{x \in tp \\ x \in [\tau_i, \tau_{i+1})}} \{f(x) + e^{inreg}(x)\},$$

$$\forall i = 2, 3 \ldots, n-1,$$

$$\overline{h}_1 \triangleq \max_{\substack{x \in tp \\ x \in (-\infty, \tau_2)}} \{f(x) - e^{inreg}(x)\}, \underline{h}_1 \triangleq \min_{\substack{x \in tp \\ x \in (-\infty, \tau_2)}} \{f(x) + e^{inreg}(x)\},$$

$$\overline{h}_n \triangleq \max_{\substack{x \in tp \\ x \in [\tau_n, +\infty)}} \{f(x) - e^{inreg}(x)\}, \underline{h}_n \triangleq \min_{\substack{x \in tp \\ x \in [\tau_n, +\infty)}} \{f(x) + e^{inreg}(x)\}.$$

The table value $y_i^*$ for $bp_i$ that is optimal for the set of test point may then be chosen (see Option A and box 806) as:

$$y_i^* \triangleq Q\left(\frac{\overline{h}_i + \underline{h}_i}{2}\right).$$

In some instances, as mentioned above, the user may not be able to specify a function $f(x)$ but rather may wish to specify merely a set of data values. The exemplary embodiments may accommodate the user providing the data values. The maximum and minimum values may be expressed so that when the user provides us a data set $\{(x_k, z_k)\}_{k=1}^m$ where $z_k$ is the observed value for its corresponding input value $x_k$, denote $$\overline{h}_i^{ds} \triangleq \max_{\substack{k \in [1,m]_N \\ x_k \in [\tau_i, \tau_{i+1})}} \{z_k - e^{integ}(x_k)\}, \underline{h}_i^{ds} \triangleq \min_{\substack{k \in [1,m]_N \\ x_k \in [\tau_i, \tau_{i+1})}} \{z_k + e^{integ}(x_k)\},$$

$$\forall i = 2, 3 \ldots, n-1,$$

$$\overline{h}_1^{ds} \triangleq \max_{\substack{k \in [1,m]_N \\ x_k \in (-\infty, \tau_2)}} \{z_k - e^{integ}(x_k)\}, \underline{h}_1^{ds} \triangleq \min_{\substack{k \in [1,m]_N \\ x_k \in (-\infty, \tau_2)}} \{z_k + e^{integ}(x_k)\},$$

$$\overline{h}_n^{ds} \triangleq \max_{\substack{k \in [1,m]_N \\ x_k \in [\tau_n, +\infty)}} \{z_k - e^{integ}(x_k)\}, \underline{h}_n^{ds} \triangleq \min_{\substack{k \in [1,m]_N \\ x_k \in [\tau_n, +\infty)}} \{z_k + e^{integ}(x_k)\}.$$

The notation that $k \in [1,m]_N$ in the above equations means that $1 <= k <= m$ where the numbers in the range are natural numbers N.

The optimal value yi*,ds given the test points may be determined as:

$$y_i^{*,ds} \triangleq Q\left(\frac{\overline{h}_i^{ds} + \underline{h}_i^{ds}}{2}\right).$$

In alternative embodiments, an optimal table value is not needed. For example, merely a near optimal table value or simply an acceptable value that will not exceed the error tolerance may be chosen (see Option B and box 808). In such cases, the feasibility analyzer and lookup table generator 402 may choose any possible value between the maximum and minimum discussed above. In some embodiments, this may involve reworking the formula for $y_i^{*,ds}$, such as not dividing by 2 but dividing by 3 or by 2.2 or some other value. Alternatively, the values of the numerator in the above formula could be weighted such as multiplying one or both by a weight.

With reference to FIG. 7 again, once the table values have been determined (see 704), the feasibility analysis may continue. A check is made whether the error ever exceeds the error tolerance (see 706). If the error does not, it is feasible (see 708) to generate the table that conforms with the error tolerance given the input. If the error exceeds the error tolerance for some table value, a determination is made that it is not feasible (see 710) to generate a lookup table that does not exceed the error tolerance given the input.

The exemplary embodiments may efficiently update table values with newly added data points. This updating may be performed for both where the lookup table approximates a function $f(x)$ and where the lookup table approximates a set of data points without an explicitly specified function. A brute force solution would be to simply update the data set to include the newly added values and recalculate the entire lookup table again. That brute force approach, however, may not be necessary, especially in cases where new data points may be received at periodic intervals. The exemplary embodiments, instead of recreating the whole lookup table, just update the table values for the newly added data points.

Figure 9:
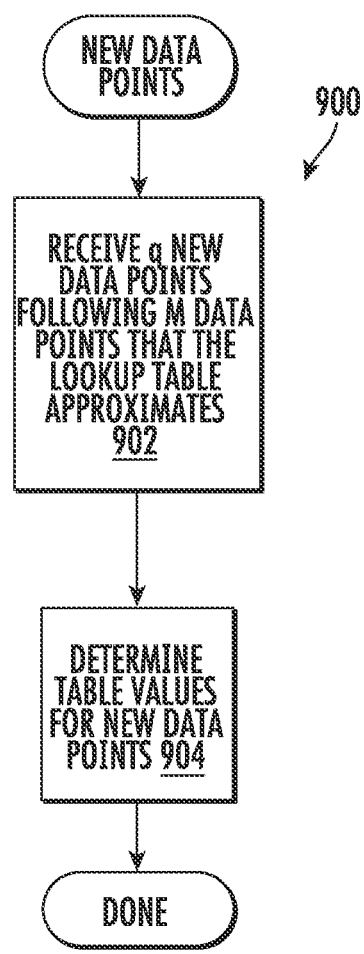
FIG. 9 depicts a flowchart of illustrative steps that may be performed to accommodate additional data points for a lookup table in an exemplary embodiment.

FIG. 9 shows a flowchart of illustrative steps that may be performed to account for the new data points. Initially, new data points totaling q in quantity are received where the table already approximates m data points (see 902). The table values for the new data points are determined (see 904) in a manner similar to how table values for data points are determined as explained above relative to FIGS. 7 and 8. Specifically, the exemplary embodiments may generate table values for q new data points designated herein as $\{(x_k, z_k)\}_{k=m+1}^{m+q}$. The maxima and minima are calculated as follows:

$$\overline{h}_i^{ds,new} \triangleq \max\left\{\overline{h}_i^{ds}, \max_{\substack{k\in[m+1,m+q]_N \\ x_k\in[\tau_i,\tau_{i+1})}} \{z_k - e^{integ}(x_k)\}\right\},$$

$$\underline{h}_i^{ds,new} \triangleq \min\left\{\underline{h}_i^{ds}, \min_{\substack{k\in[m+1,m+q]_N \\ x_k\in[\tau_i,\tau_{i+1})}} \{z_k + e^{integ}(x_k)\}\right\},$$

$$\forall\, i = 2, 3 \ldots, n-1,$$

$$\overline{h}_1^{ds,new} \triangleq \max\left\{\overline{h}_1^{ds}, \max_{\substack{k\in[m+1,m+q]_N \\ x_k\in(-\infty,\tau_2)}} \{z_k - e^{integ}(x_k)\}\right\},$$

$$\underline{h}_1^{ds,new} \triangleq \min\left\{\underline{h}_1^{ds}, \min_{\substack{k\in[m+1,m+q]_N \\ x_k\in(-\infty,\tau_2)}} \{z_k + e^{integ}(x_k)\}\right\},$$

$$\overline{h}_n^{ds,new} \triangleq \max\left\{\overline{h}_n^{ds}, \max_{\substack{k\in[m+1,m+q]_N \\ x_k\in[\tau_n,+\infty)}} \{z_k - e^{integ}(x_k)\}\right\},$$

$$\underline{h}_n^{ds,new} \triangleq \min\left\{\underline{h}_n^{ds}, \min_{\substack{k\in[m+1,m+q]_N \\ x_k\in[\tau_n,+\infty)}} \{z_k + e^{integ}(x_k)\}\right\}.$$

Where the optimal table value is desired, the optimal table value may be determined as:

$$y_i^{*,ds,new} \triangleq Q\left(\frac{\overline{h}_i^{ds,new} + \underline{h}_i^{ds,new}}{2}\right).$$

At first impression, it may seem that all table values have to be updated in this approach. However, note that in the case where for some i, if there is no $x_k$ with k=m+1, m+2, ..., m+q such that $x_k \in [\tau_i,\tau_{i+1})$, then there is really no need to update $y_i^{*,ds}$ to $y_i^{*,ds,new}$ as those values are identical.

The feasibility analyzer and lookup table generator 402 may be realized in computer programming instructions. For example, the feasibility analyzer and lookup table generator 402 may be realized in one or more computer programs, modules, routines, methods, objects, etc. The feasibility analyzer and lookup table generator 402 may be realized in an environment such as a model development environment, a model simulation environment, or a programming environment. An example of a programming environment is a technical computing environment like MATLAB® environment from The MathWorks, Inc. of Natick Mass. Exemplary simulation or modeling environments that may be used for the exemplary embodiments include the Simulink model development environment from The MathWorks, Inc. of Natick Mass., the MATLAB® algorithm development environment from The MathWorks, Inc., as well as the Simscape™ physical modeling tool and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp. of Austin, Tex., the Visual Engineering Environment (VEE) from Keysight Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level simulation environment may contain less implementation detail, and thus operate at a higher level than certain programming languages, such as the C, C++, C#, and SystemC programming languages.

Figure 10:
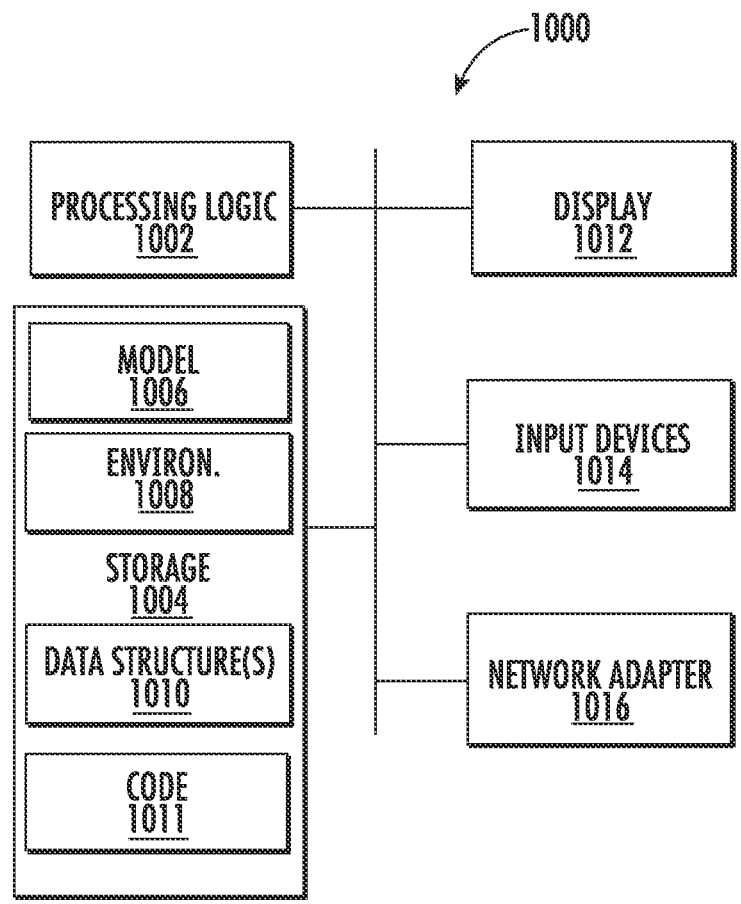
FIG. 10 depicts a block diagram of a computing device suitable for practicing an exemplary embodiment.

FIG. 10 depicts a block diagram of a computing environment 1000 suitable for practicing an exemplary embodiment. The computing environment 1000 may be a desktop computer, a laptop computer, a tablet computer, an embedded system, or other type of computing environment. The computing environment 1000 may include a processing logic 1002. The processing logic 1002 may be a central processing unit (CPU), a graphical processing unit (GPU), a field programmable gate array (FPGA), an application specific integrated circuit (ASIC), a controller, electronic circuitry, or a combination thereof. The processing logic 1002 may execute instructions to realize the functionality of the exemplary embodiments described herein. The programming language instructions may be written by a developer or may be generated from a model as described above. Alternatively, the processing logic may be configurable by configuration settings to realize the functionality. The processing logic 1002 has access to a storage 1004. The storage 1004 may be a magnetic storage device, an optical storage device, or a combination thereof. The storage may include solid state storage, hard drives, removable storage elements such as magnetic disks, optical disks, thumb drives, or the like. The storage 1004 may include RAM, ROM, and other varieties of integrated circuit storage devices.

The storage 1004 may hold computer-executable instructions as well as data, documents, and the like. In FIG. 10 the storage 1004 is shown storing a simulatable or executable model 1006. The model 1006 may be a graphical model, a textual model, or a combination thereof. The storage 1004 may include a modeling/simulation environment 1008, such as has been described above. Environment 1008 may be a programming environment, a modeling environment, or a simulation environment, such as discussed above. The environment 1008 may simulate the model 1006, and the functionality described above for the exemplary embodiments may be realized as part of the environment 1008 and model 1006. The storage 1004 may also store the data structure(s) 1010 used for representing the data and/or functionality described above. The storage 1004 may store code 1011 (e.g., programming language instructions) for performing operations for the feasibility analyzer and lookup table generator described herein, or for other applications. The computing device 1000 may include a display device 1012 for displaying textual, graphical, or video output. Examples include LED displays, LCD displays, and retinal displays. The computing device 1000 may include input devices 1014 such as a keyboard, mouse, microphone, scanner, pointing device, or the like. The computing device 1000 may include a network adapter 1016 for interfacing the computing device with a network, such as a local area network or a network that provides access to a remote network like the Internet or another web-based network.

Figure 11:
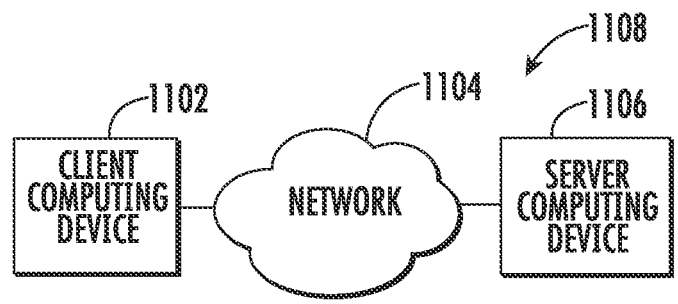
FIG. 11 depicts a block diagram of a distributed environment suitable for practicing an exemplary embodiment.

FIG. 11 depicts an illustrative distributed environment 1100 suitable for practicing exemplary embodiments. A client computing device 1102 is interfaced with a network 1104, such as a wide area network like the Internet, that is also interfaced with a server computing device 1106. The client computing device 1102 may include client code or a web browser for communicating with the server computing device 1106. For example, the simulation environment may run on the server computing device and a client on the client computing device 1102 may request that server computing device 1106 simulate the model and return the results. The server computing device 1106 may have a form like that shown in FIG. 10. The client computing device 1102 may have components like those shown in FIG. 10.

Figure 12:
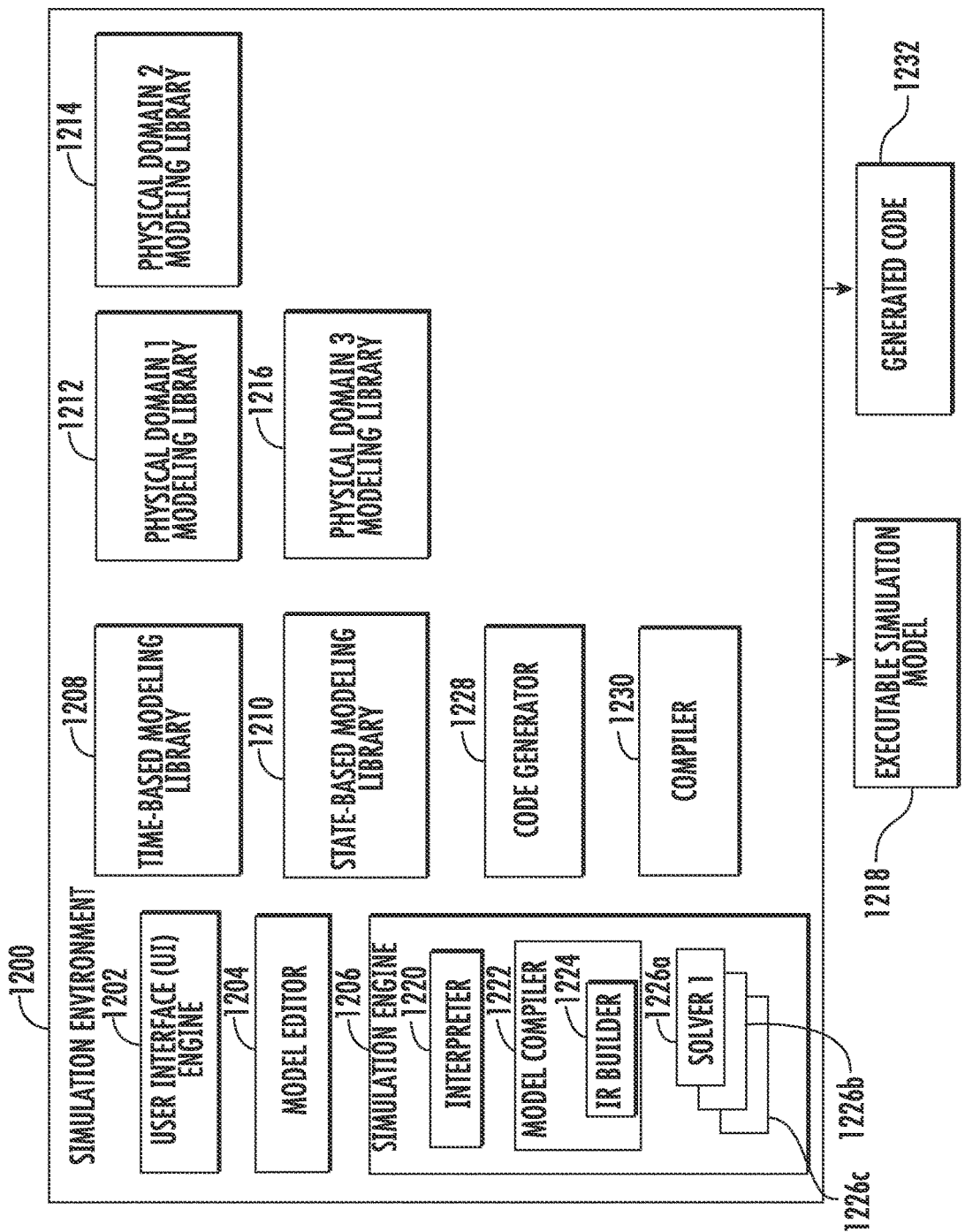
FIG. 12 depicts components of an illustrative simulation environment for an exemplary embodiment.

FIG. 12 is a partial functional diagram of an example simulation environment 1200 that may be used in some exemplary embodiments. The simulation environment 1200 may include a user interface (UI) engine 1202, a model editor 1204, a simulation engine 1206, and one or more data stores, such as libraries, that contain predefined model element types. For example, the simulation environment may include a time-based modeling library 1208, a state-based modeling library 1210, and/or one or more physical domain modeling libraries, such as physical domain modeling libraries 1212, 1214, and 1216, for modeling different physical systems. Exemplary physical domains include electrical, hydraulic, magnetic, mechanical rotation, mechanical translation, pneumatic, thermal, etc. Instances of the model element types provided by the libraries 1208, 1210, may be selected and included in an executable simulation model 1218, e.g., by the model editor 1204. The simulation engine 1206 may include an interpreter 1220, a model compiler 1222, which may include an Intermediate Representation (IR) builder 1224, and one or more solvers 1226a-c. Exemplary solvers include one or more fixed-step continuous solvers, which may utilize integration techniques based on Euler's Method or Huen's Method, and one or more variable-step solvers, which may be based on the Runge-Kutta and Dormand-Prince pair. A description of suitable solvers may be found in the Simulink User's Guide from The MathWorks, Inc. (September 2019 ed.).

The simulation environment 1200 may include or have access to other components, such as a code generator 1328 and a compiler 1230. The code generator 1228 may generate code, such as code 1232, based on the executable simulation model 1218. For example, the code 1232 may have the same or equivalent functionality and/or behavior as specified by the executable simulation model 1218. The generated code 1232, however, may be in form suitable for execution outside of the simulation environment 1200. Accordingly, the generated code 1232, which may be source code, may be referred to as standalone code. The compiler 1230 may compile the generated code 1232 to produce an executable, e.g., object code, that may be deployed on a target platform for execution, such as an embedded system.

Exemplary code generators include the HDL Coder, the Simulink Coder, the Embedded Coder, the GPU Coder, the MATLAB Coder, and the Simulink PLC Coder products from The MathWorks, Inc. of Natick, Mass., and the TargetLink product from dSpace GmbH of Paderborn Germany. Exemplary code 1232 that may be generated for the executable simulation model 1218 includes textual source code compatible with a programming language, such as the C, C++, C#, Ada, Structured Text, Fortran, and MATLAB languages, among others. Alternatively or additionally, the generated code 1232 may be (or may be compiled to be) in the form of object code or machine instructions, such as an executable, suitable for execution by a target device of an embedded system, such as a central processing unit (CPU), a microprocessor, a digital signal processor, etc. In some embodiments, the generated code 1232 may be in the form of a hardware description, for example, a Hardware Description Language (HDL), such as VHDL, Verilog, a netlist, or a Register Transfer Level (RTL) description. The hardware description may be utilized by one or more synthesis tools to configure a programmable hardware device, such as Programmable Logic Devices (PLDs), Field Programmable Gate Arrays (FPGAs), and Application Specific Integrated Circuits (ASICs), among others. The generated code 1232 may be stored in memory, such as a main memory or persistent memory or storage, of a data processing device. While the discussion herein has focused on exemplary embodiments, it should be appreciated that various changes in form and detail may be made without departing from the intended scope as defined in the appended claims.

The invention claimed is:

1. A processor-implemented method for programmatically indicating feasibility of programmatic generation of a lookup table, comprising:
receiving as input an indication of a function that the lookup table is to approximate or a set of data points which the lookup table is to approximate;
receiving as input breakpoint positions;
processing the received inputs with the processor to determine if it is feasible to programmatically generate the lookup table so that an error tolerance is satisfied given the breakpoint positions;
where it is determined that it is not feasible to programmatically generate the lookup table, generating with the processor an output indication that it is not feasible to programmatically generate the lookup table; and where it is determined that it is feasible to programmatically generate the lookup table, programmatically generating the lookup table with the processor.

2. The method of claim 1, further comprising receiving as input one or more of an indication of the error tolerance, a data type of table values or test points.

3. The method of claim 1, where it is determined that it is feasible to programmatically generate the lookup table, the method further comprising generating an output indication that it is feasible to programmatically generate the lookup table.

4. The method of claim 1, further comprising, where the lookup table is programmatically generated, outputting a visualization of table values of the lookup table.

5. The method of claim 1, further comprising, where it is determined that it is feasible to programmatically generate the lookup table, the output indication is a feasibility margin and/or an indication that it is feasible to programmatically generate the lookup table.

6. A processor-implemented method, comprising:
receiving as input an indication of a function that a lookup table is to approximate or a set of data points which the lookup table is to approximate, and breakpoint positions;
processing the received input with the processor to determine if it is feasible to programmatically generate the lookup table so that an error tolerance is satisfied;
determining with the processor that it is not feasible to programmatically generate the lookup table so that the error tolerance is satisfied and generating with the processor an output indication that it is not feasible to programmatically generate the lookup table so that the error tolerance is satisfied; and
outputting on an output device at least one suggestion for modifying one of the breakpoint positions or the error tolerance.

7. The method of claim 6, wherein the at least one suggestion comprises a suggestion for modifying the error tolerance.

8. The method of claim 6, wherein the at least one suggestion comprises a suggestion for modifying the breakpoint positions.

9. A processor-implemented method, comprising:
performing with the processor a feasibility margin analysis that identifies approximation error values between function values or data points and lookup table values for a lookup table;
generating a user interface on an output device that depicts the approximation error values relative to an error tolerance, the user interface including at least one activatable user interface element;
in response to activation of one of the at least one activatable user interface element, making a corresponding modification for the lookup table; and
programmatically generating the lookup table with the processor based on the modification.

10. The method of claim 9, wherein the at least one activatable user interface element that is activated is a graphical element that may be altered to modify the error tolerance.

11. The method of claim 9, wherein the at least one activatable user interface element that is activated is a graphical element that may be altered to modify the breakpoint positions.

12. A method performed by a processor of a computing device, comprising:
receiving as inputs: a specification of a sequence of breakpoints ranging from a first breakpoint to a last breakpoint, and a specification of data values for a lookup table;
setting as a current breakpoint the first breakpoint in the sequence;
with the processor:
(a) determining for each test point in a sequence of test points ranging from a first test point to a last test point in an interval between the current breakpoint and a next breakpoint in the sequence a difference between each data value and an error function value;
(b) determining a maximum of the differences for the interval;
(c) determining for each test point in the sequence of test points ranging from the first test point to the last test point in the interval between the current breakpoint and a next breakpoint in the sequence a sum of the each data value and the error function value for the data value;
(d) determining a minimum of the sums for the interval;
(e) determining a table value for the current breakpoint to be a value between the maximum of the differences and a minimum of the sums; and
(f) programmatically generating the lookup table having the determined table value for the current breakpoint.

13. The method of claim 12, wherein the lookup table employs zero-order interpolation.

14. The method of claim 13, wherein the zero-order interpolation is one of flat interpolation or nearest interpolation.

15. A method performed by a processor of a computing device, comprising:
receiving additional data points for a lookup table to approximate where the lookup table has a table value for each breakpoint of the lookup table;
processing the additional data points with the processor to determine which breakpoints warrant modification of the table values and to determine updated table values for the determined breakpoints; and
updating the lookup table with the processor to include the determined updated table values.

16. A non-transitory computer-readable storage medium storing computer programming instructions for causing a processor to:
receive as input an indication of a function that a lookup table is to approximate or a set of data points which the lookup table is to approximate;
receive as input breakpoint positions;
process the received inputs with the processor to determine if it is feasible to programmatically generate the lookup table so that an error tolerance is satisfied given the breakpoint positions;
where it is determined that it is not feasible to programmatically generate the lookup table, generate with the processor an output indication that it is not feasible to programmatically generate the lookup table; and
where it is determined that it is feasible to programmatically generate the lookup table, programmatically generating the lookup table with the processor.

17. The non-transitory computer-readable storage medium of claim 16, further storing instructions for causing the processor to generate an output indication that it is feasible to programmatically generate the lookup table where it is determined that it is feasible to programmatically generate the lookup table.

18. The non-transitory computer-readable storage medium of claim 16, further storing instructions for causing the processor to output a visualization of table values of the lookup table where it is determined that it is feasible to programmatically generate the lookup table.

19. The non-transitory computer-readable storage medium of claim 16, wherein, if it is determined that it is feasible to programmatically generate the lookup table, the output indication is a feasibility margin and/or an indication that it is feasible to programmatically generate the lookup table.

20. A non-transitory computer-readable storage medium storing computer programming instructions for causing a processor to perform a processor-implemented method, comprising:
receiving as input an indication of a function that the lookup table is to approximate or a set of data points which the lookup table is to approximate, and breakpoint positions;
processing the received input with the processor to determine if it is feasible to programmatically generate the lookup table so that an error tolerance is satisfied;
determining with the processor that it is not feasible to programmatically generate the lookup table so that the error tolerance is satisfied and generating with the processor an output indication that it is not feasible to programmatically generate the lookup table so that the error tolerance is satisfied; and
outputting on an output device at least one suggestion for modifying one of the breakpoint positions or the error tolerance.

21. A non-transitory computer-readable storage medium storing computer programming instructions for causing a processor to:
perform a feasibility margin analysis that identifies approximation error values between function values or data points and lookup table values for a lookup table;
generate a user interface on an output device that depicts the approximation error values relative to an error tolerance, the user interface including at least one activatable user interface element;
in response to activation of one of the at least one activatable user interface element, make a corresponding modification for the lookup table; and
programmatically generate the lookup table with the modification.

22. A computing device, comprising:
a memory and/or storage for storing a feasibility analyzer and lookup table generator;
a processor for executing the feasibility analyzer and lookup table generator to:
receive as input an indication of a function that a lookup table is to approximate or a set of data points which the lookup table is to approximate;
receive as input breakpoint positions;
process the received inputs with the processor to determine if it is feasible to programmatically generate the lookup table so that an error tolerance is satisfied given the breakpoint positions;
where it is determined that it is not feasible to programmatically generate the lookup table, generate an output indication that it is not feasible to programmatically generate the lookup table; and
where it is determined that it is feasible to programmatically generate the lookup table, programmatically generating the lookup table with the processor.

23. A non-transitory computer-readable storage medium storing computer programming instructions for causing a processor to:
receive as inputs: a specification of a sequence of breakpoints ranging from a first breakpoint to a last breakpoint, and a specification of data values for a lookup table;
set as a current breakpoint the first breakpoint in the sequence;
determine for each test point in a sequence of test points ranging from a first test point to a last test point in an interval between the current breakpoint and a next breakpoint in the sequence a difference between each data value and an error function value;
determine a maximum of the differences for the interval;
determine for each test point in the sequence of test points ranging from the first test point to the last test point in the interval between the current breakpoint and a next breakpoint in the sequence a sum of the each data value and the error function value for the data value;
determine a minimum of the sums for the interval;
determine a table value for the current breakpoint to be a value between the maximum of the differences and a minimum of the sums; and
programmatically generate the lookup table having the determined table value for the current breakpoint.

24. The non-transitory computer-readable storage medium of claim 23, wherein the lookup table employs zero-order interpolation.

25. The non-transitory computer-readable storage medium of claim 23, wherein the zero-order interpolation is one of flat interpolation or nearest interpolation.

26. The non-transitory computer-readable storage medium of claim 16, further storing computer programming instructions for causing a processor to receive as input one or more of an indication of the error tolerance, a data type of table values or test points.

* * * * *